(12) United States Patent
Rowlett et al.

(10) Patent No.: US 6,318,279 B1
(45) Date of Patent: Nov. 20, 2001

(54) SEED BOOT ATTACHMENT AND WEAR RESISTANT INSET THEREFOR

(75) Inventors: Don C. Rowlett, Bedford, PA (US); Gerry S. Swab, Rosthern; James W. Henry, Saskatoon, both of (CA)

(73) Assignees: Kennametal Inc., Latrobe, PA (US); Flexi-Coil Ltd., Saskatoon (CA)

( * ) Notice: Subject to any disclaimer, the term of this patent is extended or adjusted under 35 U.S.C. 154(b) by 0 days.

(21) Appl. No.: 09/779,916

(22) Filed: Feb. 8, 2001

(51) Int. Cl.$^7$ ............................... A01C 5/00; A01B 15/00
(52) U.S. Cl. ............................ 111/154; 172/719; 172/772
(58) Field of Search .................................. 111/154, 149, 111/123, 124, 125, 126, 120, 152, 153, 156; 172/721, 722, 723, 724, 732, 699, 772, 772.5, 719

(56) References Cited

U.S. PATENT DOCUMENTS

| | | | |
|---|---|---|---|
| 5,159,985 | 11/1992 | Rowlett | 172/723 |
| 5,297,637 | 3/1994 | Rowlett | 172/604 |
| 5,310,009 | 5/1994 | Rowlett | 172/723 |
| 5,314,029 | 5/1994 | Rowlett | 172/699 |
| 5,325,799 | 7/1994 | Rowlett | 111/152 |
| 5,429,016 | 7/1995 | Rowlett | 76/115 |
| 5,429,199 | 7/1995 | Sheirer et al. | 175/321 |
| 5,697,308 | 12/1997 | Rowlett | 111/149 |

OTHER PUBLICATIONS

Advertisement, "Precision Seeding Tools," Flexi–Coil Ltd., 2000, 3 pages,.

Primary Examiner—Christopher J. Novosad
(74) Attorney, Agent, or Firm—Larry R. Meenan

(57) ABSTRACT

A seed boot attachment for depositing a seed within a furrow including a synclinal shape housing extending to a forward point, furrow forming points extending rearwardly and downwardly from opposing side edges of a bottom surface of the housing, and at least one wear resistant insert secured to at least one of the side member of the furrow forming point, the insert comprising a truncated polyhedron, having a top face of a triangular shape, an opposing flat bottom face of a triangular shape and angled side faces extending between the peripheral edges of the top and bottom faces wherein at least two of the outer corners of the polyhedron are radiused.

20 Claims, 4 Drawing Sheets

SEED BOOT ATTACHMENT AND WEAR RESISTANT INSET THEREFOR

BACKGROUND OF THE INVENTION

1. Field of the Invention

The present invention relates to a seed boot attachment and a wear resistant insert therefor. More particularly, the present invention relates to a seed boot attachment including a wear resistant insert for use on a ground engaging planting/seeding tool.

2. Description of the Related Art

The proper depositing of seeds and fertilizer into a v-shaped furrow formed in the soil requires special care in handling the seeds and the fertilizer and in maintaining the sidewalls of the furrow to ensure that the seed and the fertilizer are deposited within the v-shaped furrow at the proper depth. It will be appreciated that if a seed boot is in a worn condition, loose soil from the sidewalls of the v-shaped furrow may spill into the furrow before the seed and fertilizer are deposited or the seed and fertilizer may be blown or bounced around or out of the furrow, such that the seed and fertilizer are prevented from being deposited in the furrow or from reaching a proper planting depth. To achieve proper planting depth and prevent soil from collapsing in the furrow prior to depositing the seed and fertilizer a worn seed boot must be either continually adjusted for proper height with the bottom of the furrow or the seed boot must be replaced.

Replacement of a worn seed boot results in lost planting time and reduced cost efficiency. Previous attempts to improve the wear life of the double seed boot have met with limited success. For example, it was found that the heat treatment and quenching process of a seed boot resulted in cracks forming during the quenching process thereby rendering the seed boot unacceptable. Furthermore, overlays of tungsten carbide materials in a base matrix resulted in a rough surface and protrusions such that soil material would buildup on the seed boot. This caused poor seed bed quality and compromised seed and fertilizer separation.

Although carbide inserts were successful in maintaining the shape of the furrows and precluded soil build up issues, carbide inserts are very brittle.

To address the foregoing concerns, the present invention includes wear resistant inserts of a specific geometry secured to the seed boot to protect the seed boot from wear and contribute to proper depositing of seed and fertilizer within the furrow.

SUMMARY OF THE INVENTION

The present invention is directed to a seed boot attachment having improved wear resistance.

An exemplary embodiment of the invention includes a seed boot attachment for depositing a seed within a furrow comprising a synclinal shape housing extending to a forward point, furrow forming points extending rearwardly and downwardly from opposing side edges of a bottom surface of the housing; and at least one wear insert secured to at least one of the side member of the furrow forming point, the insert comprising a truncated polyhedron, having a top face of a triangular shape, an opposing flat bottom face of a triangular shape and angled side faces extending between the peripheral edges of the top and bottom faces wherein at least two of the outer corners of the polyhedron are radiused.

BRIEF DESCRIPTION OF THE DRAWINGS

The invention may take physical form in certain parts and arrangements of parts, preferred embodiments of which will be described in detail in this specification. The invention is illustrated in the accompanying drawings which show.

DESCRIPTION OF THE PREFERRED EMBODIMENT

Figure 1:
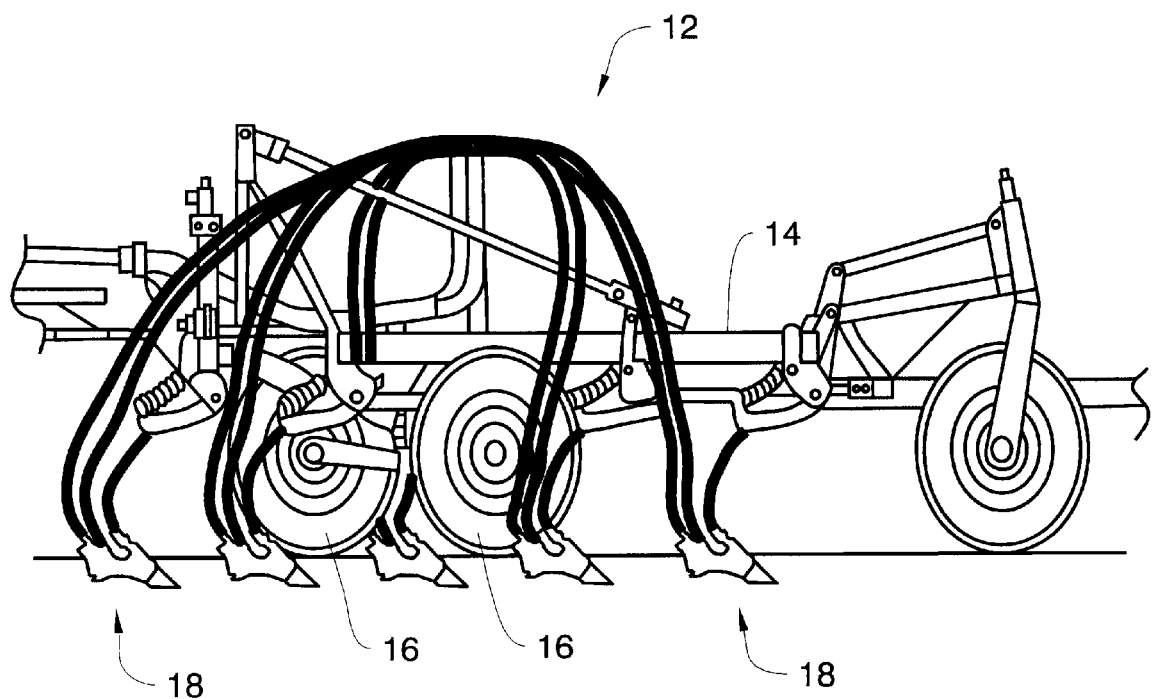
FIG. 1 is a side view of a tiller.
Figure 2:
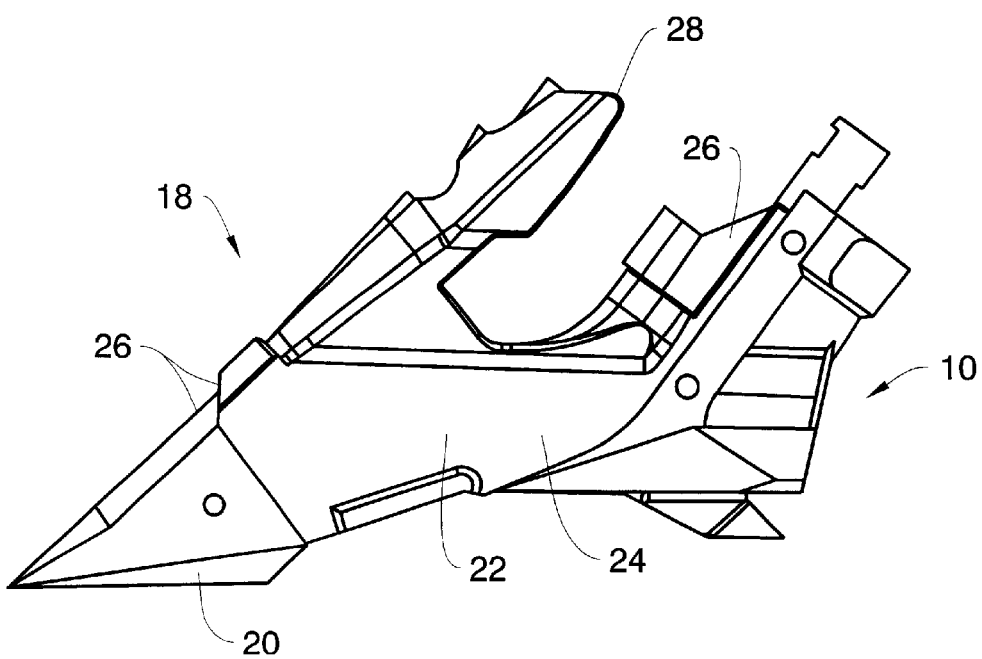
FIG. 2 is a side view of an opener including a ground engaging tip, main body and seed boot attachment.
Figure 3:
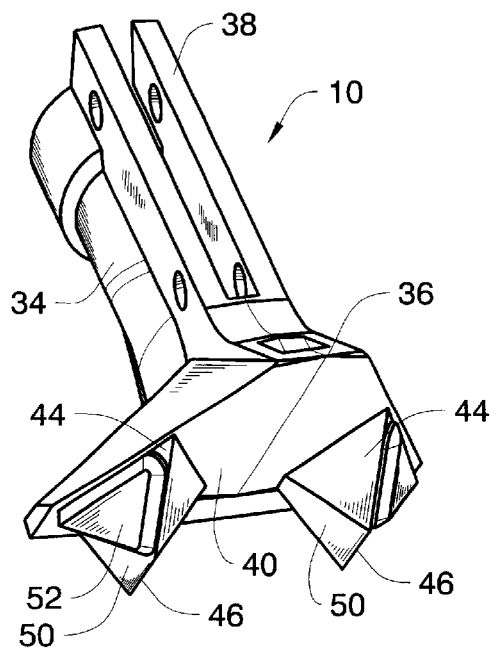
FIG. 3 is a perspective view of a seed boot attachment of FIG. 2.
Figure 4:
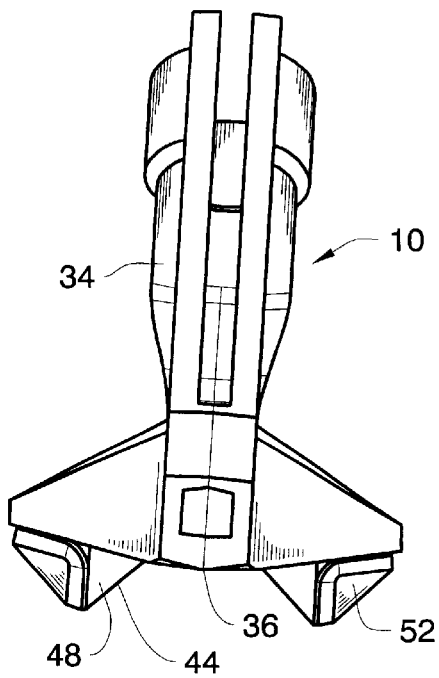
FIG. 4 is an end view of the seed boot attachment of FIG. 3.
Figure 5:
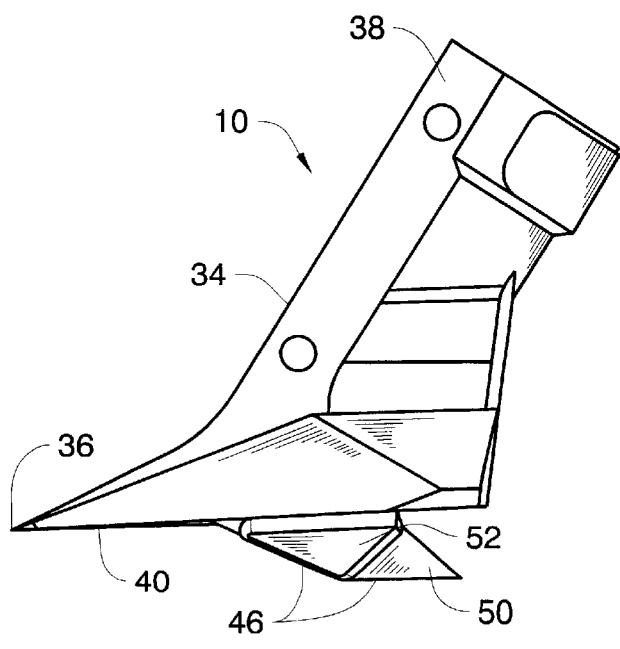
FIG. 5 is a side view of the seed boot attachment of FIG. 3.
Figure 6:
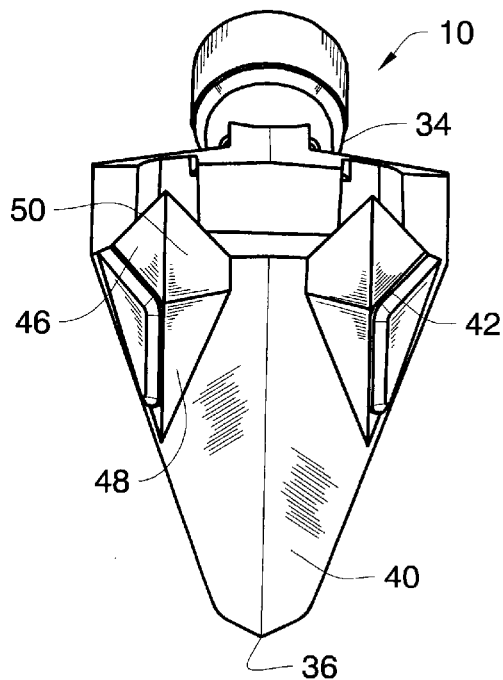
FIG. 6 is a bottom view of the seed boot attachment of FIG. 3.

Referring now to the drawings wherein the showings are for the purposes of illustrating the preferred embodiments of the invention only and not for purposes of limiting same, the invention shows a seed boot attachment 10. The attachment is one component of a modular seed planting system 12, see FIG. 1. The seed planting system 12 includes an elongated tool bar 14 which is supported for movement across and over fields by a plurality of wheels 16 and which is adapted to be towed in a given forward direction by a power source such as an off-highway tractor or the like. Attached to the tool bar 12 are a plurality of planting units 18; with only one being illustrated in FIG. 2 and described in detail and from which a complete understanding of the present invention may be readily discerned.

As is well known in the art, the planting units 18 are mounted in side-by-side relation relative to each other along the length of the tool bar 14. In the illustrated embodiment, each planting unit 18 preferably includes a replaceable ground engaging tip 20, a narrow main body member 22 and a rear seed boot attachment 10. The ground engaging tip 20, main body member 22 and seed boot attachment 10 may be made by casting from autempered ductile iron, chrome iron and the like or otherwise formed as individually connected steel parts.

In a preferred embodiment, the ground engaging tip 20, main body member 22 and rear seed boot attachment 10 are of a design commercially available from Flexi-Coil of Saskatchewan, Canada. This seeding configuration 18 is generally accepted and used over a wide area of the great plains of North America. It will be appreciated that within this geographic region many different soil types occur. The present invention is primarily concerned with soil that can be characterized as having highly abrasive properties. These types of soils significantly reduce the wear life of the tips 20 and seed boot attachments 10 thereby increasing maintenance costs and downtime as previously described.

In a preferred embodiment, the main body member 22 comprises a housing 24 having front and rear brackets 26 projecting therefrom, a mounting area 28, three inlets and outlets and three internal passages (not shown). The mounting area 28 is for attachment to the tool bar 14 using conventional attachment means well known in the art.

Seed and fertilizer are typically delivered from conventional storage boxes to a metering assembly (not shown) of conventional design that supplies a controlled volume of seed and fertilizer to a flexible delivery tube 32. The lower end of the delivery tube 32 directs the seeds and fertilizer into separate inlets of the main body member 22 and through passages in the main body member to the seed boot attachment 10, for distribution in a single row into a furrow created by the seed boot attachment. For a more detailed discussion of the metering assembly reference is made to U.S. Pat. No. 6,158,363, incorporated herein by reference.

As shown in the figures, the seed boot attachment 10 splits seed from the main body member 22 into two rows about 3 inches apart. The paired row of seeds straddles a single row of fertilizer. The fertilizer is placed about 1 inch deeper in the middle furrow than the seeds are placed in the adjacent rows.

Referring to FIGS. 3–6, the seed boot attachment 10 includes a generally synclinal shape housing 34 extending to a forward point 36. A forward facing bracket 38 extends from the housing 34 for attachment to the main body member 22. Extending rearwardly and downwardly from opposing edges of the bottom 40 of the housing 34 are furrow forming points 42.

The furrow forming points 42 on the seed boot attachment 10 create a firm shelf in the soil for placing the seed. In addition the furrow forming points 42 are designed to force loose soil inwards from the furrow covering the fertilizer and enhancing separation between seed and fertilizer. It will be appreciated that the maintenance of the vertical and horizontal separations between the seed and fertilizer is critical to maintain seedling safety. The relative seed and fertilizer placements also position fertilizer where the plant roots are most likely to intercept it. If the separation is compromised, varying degrees of seedling germination damage can occur. In situations where high rates of nutrients are in direct contact with germinating seeds, there is a high probability of seedling mortality. As the furrow forming points wear, they become smaller and seed separation from the fertilizer is reduced and risk of seedling injury increases. When the furrow forming points have reached their wear limit, soil will block the seed outlets and there is minimal separation between seed and fertilizer.

As shown in FIGS. 3–6, the furrow forming points 42 include opposing side surfaces 44 that converge downwardly from the bottom surface 40 of the seed boot attachment 10 to a center edge 46. Each side surface 44 comprises interior and exterior triangular shape leading surfaces 48 contiguous interior and exterior trapezoidal shape trailing surfaces 50.

In accordance with the present invention, wear resistant inserts 52 are secured to the furrow forming points 42. The inserts 52 are preferably secured to the furrow forming points 42 before any austempering process by a high temperature brazing process that withstands austempering temperatures.

Figure 7:
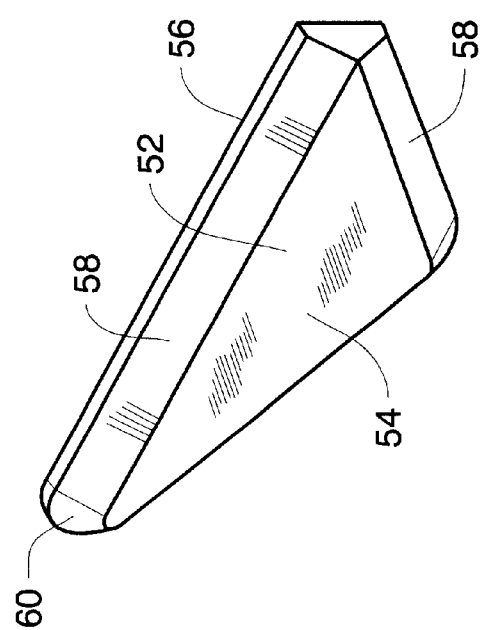
FIG. 7 is a perspective view of a wear resistant insert.
Figure 9:
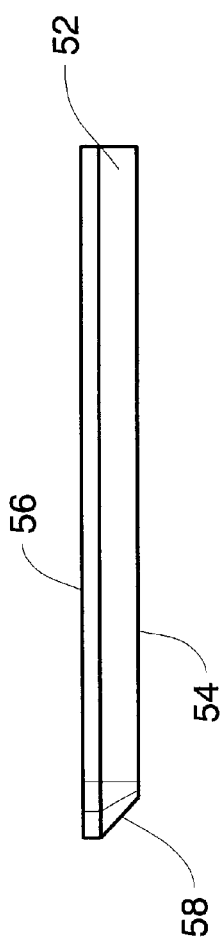
FIG. 9 is a side view of the wear resistant insert of FIG. 7.
Figure 8:
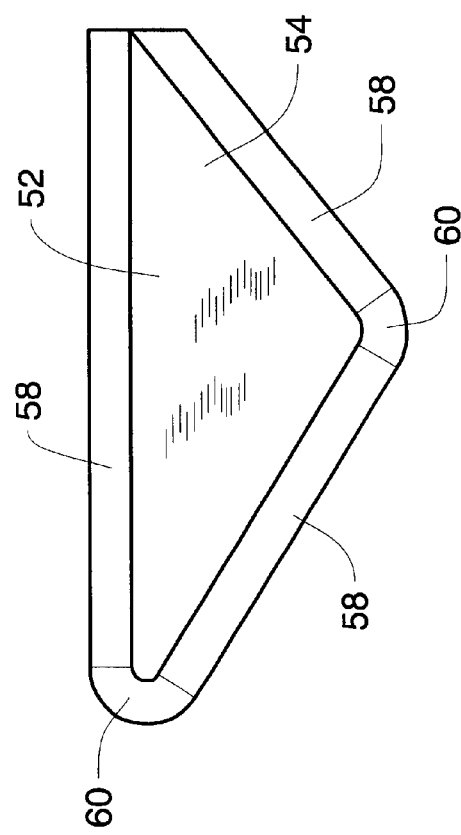
FIG. 8 is a front view of the wear resistant insert of FIG. 7.
Figure 10:
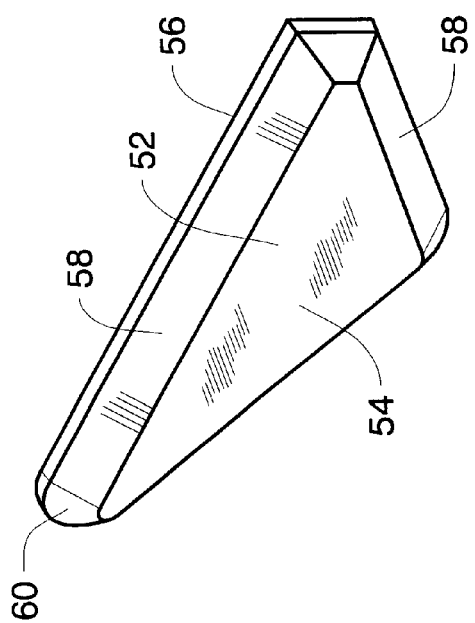
FIG. 10 is an alternate embodiment of a perspective view of a wear resistant insert.
Figure 12:
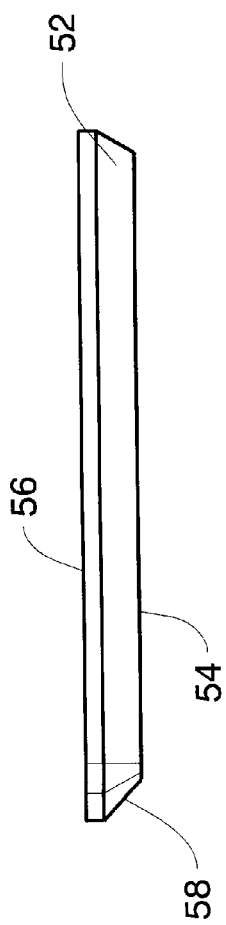
FIG. 12 is a side view of the wear resistant insert of FIG. 10.
Figure 11:
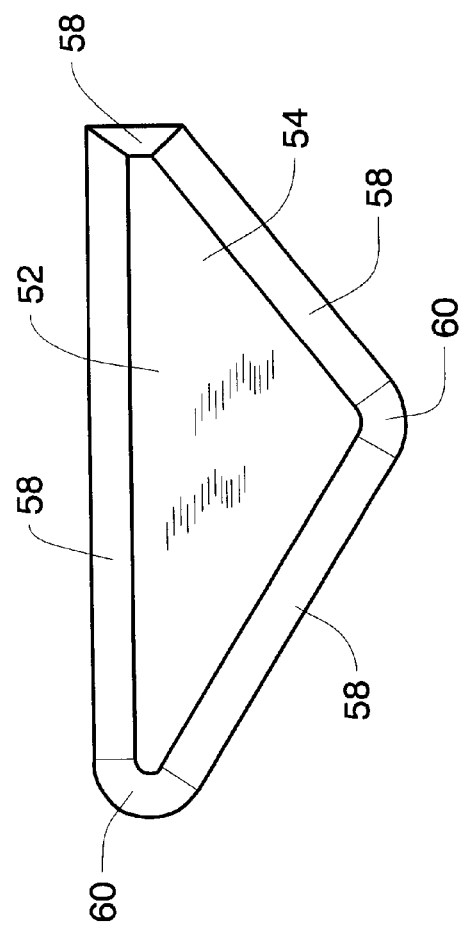
FIG. 11 is a front view of the wear resistant insert of FIG. 10.

As shown in FIGS. 3–6, a wear resistant insert 52 is secured to at least one of the exterior leading surfaces 48 of the furrow forming point 42. The inserts 52 generally are of a truncated polyhedron shape and include a top face 54 of a triangular shape, an opposing flat bottom face 56 of a triangular shape and angled side faces 58 or chamfered faces extending between the peripheral edges of the top and bottom faces. At least two (FIGS. 7–9) and up to three of the outer corners 60 of the polyhedron are radiused or rounded. In an alternate embodiment, the third corner may be chamfered as shown in FIGS. 10–12. The wear resistant insert 52 in accordance with the present invention is of a shape to enhance material flow over the insert and reduce susceptibility to breakage from impacts on obstructions and the like in the soil.

It will be appreciated that although the illustrated insert is generally triangular shaped, still other insert configurations can be used in accordance with the teachings of this invention so long as the insert has chamfered side edges and rounded corners. For example, inserts having a trapezoidal, or rectangular shape, etc. can be used. The inserts are typically formed from cemented carbide such as tungsten carbide, tungsten-titanium carbide, etc. using procedures and processes well know in the art of cemented carbide. In a preferred embodiment, the cemented carbide is K3030C commercially available from Kennametal Inc. comprising about 11–12 wt % cobalt and the remainder tungsten carbide.

While the invention has been specifically described in connection with certain specific embodiments thereof, it is to be understood that this is by way of illustration and not of limitation, and the scope of the appended claims should be construed as broadly as the prior art will permit.

What is claimed is:

1. A seed boot attachment for depositing a seed within a furrow comprising a synclinal shape housing extending to a forward point, furrow forming points extending rearwardly and downwardly from opposing side edges of a bottom surface of the housing; and
    at least one wear resistant insert secured to at least one of the side member of the furrow forming point, the insert comprising a truncated polyhedron, having a top face of a triangular shape, an opposing flat bottom face of a triangular shape and angled side faces extending between the peripheral edges of the top and bottom faces wherein at least two of the outer corners of the polyhedron are radiused.

2. The seed boot attachment of claim 1 wherein at least three of the outer corners of the polyhedron are radiused.

3. The seed boot attachment of claim 1 wherein a third outer corner of the polyhedron is chamfered.

4. The seed boot attachment of claim 1 wherein the furrow forming points include opposing side surfaces that converge downwardly from a bottom surface of the seed boot attachment to a center edge.

5. The seed boot attachment of claim 4 wherein each side surface comprises interior and exterior triangular shape leading surfaces contiguous interior and exterior trapezoidal shape trailing surfaces.

6. The seed boot attachment of claim 5 wherein the wear resistant inserts are secured to the furrow forming points by high temperature brazing.

7. The seed boot attachment of claim 4 wherein the wear resistant insert is secured to at least one of the exterior leading surfaces of the furrow forming point.

8. The seed boot attachment of claim 1 wherein the wear resistant inserts are formed from cemented carbide.

9. The seed boot attachment of claim 1 wherein the wear resistant inserts are formed from a material selected from the group consisting of tungsten carbide and tungsten-titanium carbide.

10. The seed boot attachment of claim 1 wherein the seed boot attachment is made by casting from a material selected from the group consisting of autempered ductile iron and chrome iron.

11. A modular seed planting system including an elongated tool bar supported for movement by a plurality of wheels and which is adapted to be towed in a given forward direction by a power, attached to the tool bar are a plurality of planting units mounted in side-by-side relation relative to each other along the length of the tool bar, each planting unit including a replaceable ground engaging tip, a narrow main body member and a rear seed boot attachment, the seed boot attachment comprising a synclinal shape housing extending to a forward point, furrow forming points extending rearwardly and downwardly from opposing side edges of a bottom surface of the housing; and at least one wear resistant insert secured to at least one of the side member of the furrow forming point, the insert comprising a truncated polyhedron, having a top face of a triangular shape, an opposing flat bottom face of a triangular shape and angled side faces extending between the peripheral edges of the top and bottom faces wherein at least two of the outer corners of the polyhedron are radiused.

12. The seed boot attachment of claim 11 wherein at least three of the outer corners of the polyhedron are radiused.

13. The seed boot attachment of claim 11 wherein the furrow forming points include opposing side surfaces that converge downwardly from a bottom surface of the seed boot attachment to a center edge.

14. The seed boot attachment of claim 13 wherein each side surface comprises interior and exterior triangular shape leading surfaces contiguous interior and exterior trapezoidal shape trailing surfaces.

15. The seed boot attachment of claim 14 wherein the wear resistant inserts are secured to the furrow forming points by high temperature brazing.

16. The seed boot attachment of claim 13 wherein the wear resistant insert is secured to at least one of the exterior leading surfaces of the furrow forming point.

17. The seed boot attachment of claim 11 wherein the wear resistant inserts are formed from cemented carbide.

18. The seed boot attachment of claim 11 wherein the wear resistant inserts are formed from a material selected from the group consisting of tungsten carbide and tungsten-titanium carbide.

19. The seed boot attachment of claim 11 wherein the seed boot attachment is made by casting from a material selected from the group consisting of autempered ductile iron and chrome iron.

20. A seed boot attachment for depositing a seed within a furrow comprising a synclinal shape housing extending to a forward point and having furrow forming points including opposing side surfaces that converge rearwardly and downwardly from opposing side edges of a bottom surface of the housing to a center edge, each side surface having interior and exterior triangular shape leading surfaces contiguous interior and exterior trapezoidal shape trailing surfaces; and at least one wear resistant insert secured to at least one of the exterior leading surfaces of the furrow forming point, the insert comprising a truncated polyhedron, having a top face of a triangular shape, an opposing flat bottom face of a triangular shape and angled side faces extending between the peripheral edges of the top and bottom faces wherein at least two of the outer corners of the polyhedron are radiused.

* * * * *